(12) United States Patent
Mochizuki

(10) Patent No.: US 12,498,661 B2
(45) Date of Patent: Dec. 16, 2025

(54) ELECTRONIC APPARATUS AND DRIVE CONTROL METHOD CAPABLE OF SUPPRESSING CURRENT FLOWING WHEN POWER SUPPLY IS RESUMED

(71) Applicant: KYOCERA Document Solutions Inc., Osaka (JP)

(72) Inventor: Masayuki Mochizuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 18/603,076

(22) Filed: Mar. 12, 2024

(65) Prior Publication Data
US 2024/0310767 A1    Sep. 19, 2024

(30) Foreign Application Priority Data
Mar. 13, 2023    (JP) .................................. 2023-038438

(51) Int. Cl.
*G03G 15/00* (2006.01)
*H02J 9/00* (2006.01)

(52) U.S. Cl.
CPC .......... *G03G 15/5004* (2013.01); *H02J 9/005* (2013.01)

(58) Field of Classification Search
USPC .......................................................... 399/88
See application file for complete search history.

(56) References Cited

U.S. PATENT DOCUMENTS

| | | | | |
|---|---|---|---|---|
| 2011/0058217 A1* | 3/2011 | Saito | .................. | G03G 15/5004 358/1.15 |
| 2013/0111244 A1* | 5/2013 | Yokomizo | .......... | G03G 15/5004 713/323 |
| 2017/0076189 A1* | 3/2017 | Kobayashi | ............ | G06F 3/1286 |

FOREIGN PATENT DOCUMENTS

| | | | | |
|---|---|---|---|---|
| EP | 2624054 A2 | * | 8/2013 | ......... G03G 15/5004 |
| JP | 2016102912 A | | 6/2016 | |

* cited by examiner

*Primary Examiner* — Quana Grainger
(74) *Attorney, Agent, or Firm* — Alleman Hall & Tuttle LLP

(57) ABSTRACT

An electronic apparatus includes a power supply portion, a plurality of loads, a drive portion, and a restriction processing portion. The plurality of loads are driven by power output from the power supply portion. The drive portion is provided corresponding to each of the loads and performs a state transition between a drive state in which the load is driven and a non-drive state in which the load is not driven. When stoppage of power supply from the commercial power supply to the power supply portion continues beyond a reference time while a plurality of drive portions are in the drive state, the restriction processing portion can restrict activation of some or all of a plurality of loads whose operations have been stopped by the stoppage of the power supply from the commercial power supply in response to resumption of the power supply from the commercial power supply.

6 Claims, 5 Drawing Sheets

| | SPECIFIC VALUE |
|---|---|
| FIRST DRIVE PORTION 51 | 3 |
| SECOND DRIVE PORTION 52 | 3 |
| THIRD DRIVE PORTION 53 | 2 |
| FOURTH DRIVE PORTION 54 | 2 |
| FIFTH DRIVE PORTION 55 | 2 |

ELECTRONIC APPARATUS AND DRIVE CONTROL METHOD CAPABLE OF SUPPRESSING CURRENT FLOWING WHEN POWER SUPPLY IS RESUMED

INCORPORATION BY REFERENCE

This application is based upon and claims the benefit of priority from the corresponding Japanese Patent Application No. 2023-038438 filed on Mar. 13, 2023, the entire contents of which are incorporated herein by reference.

BACKGROUND

The present disclosure relates to an electronic apparatus and a drive control method.

An electronic apparatus such as a multifunction peripheral including a power supply portion that outputs power in response to power supply from a commercial power supply, and a plurality of loads driven by the power output from the power supply portion is known. Also known is the electronic apparatus including a drive portion provided corresponding to each of the loads and configured to perform a state transition between a drive state in which the load is driven and a non-drive state in which the load is not driven.

SUMMARY

An electronic apparatus according to an aspect of the present disclosure includes a power supply portion, a plurality of loads, a drive portion, and a restriction processing portion. The power supply portion outputs power in response to power supply from a commercial power supply. The plurality of loads are driven by the power output from the power supply portion. The drive portion is provided corresponding to each of the loads and performs a state transition between a drive state in which the load is driven and a non-drive state in which the load is not driven. When stoppage of power supply from the commercial power supply to the power supply portion continues beyond a predetermined reference time while a plurality of drive portions of the drive portions are in the drive state, the restriction processing portion can restrict activation of some or all of a plurality of loads of the loads whose operations have been stopped by the stoppage of the power supply from the commercial power supply in response to resumption of the power supply from the commercial power supply.

A drive control method according to another aspect of the present disclosure is executed in an electronic apparatus including: a power supply portion configured to output power in response to power supply from a commercial power supply; a plurality of loads configured to be driven by the power output from the power supply portion; and a drive portion provided corresponding to each of the loads and configured to perform a state transition between a drive state in which the load is driven and a non-drive state in which the load is not driven, the drive control method comprising: when stoppage of power supply from the commercial power supply to the power supply portion continues beyond a predetermined reference time while a plurality of drive portions of the drive portions are in the drive state, restricting activation of some or all of a plurality of loads of the loads whose operations have been stopped by the stoppage of the power supply from the commercial power supply in response to resumption of the power supply from the commercial power supply.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a diagram showing an example of table data stored in the image forming apparatus according to the embodiment of the present disclosure.

DETAILED DESCRIPTION

An embodiment of the present disclosure will be described below with reference to the accompanying drawings. It is noted that the following embodiment is an example of embodying the present disclosure and does not limit the technical scope of the present disclosure.

[Configuration of Image Forming Apparatus 100]

Figure 1:
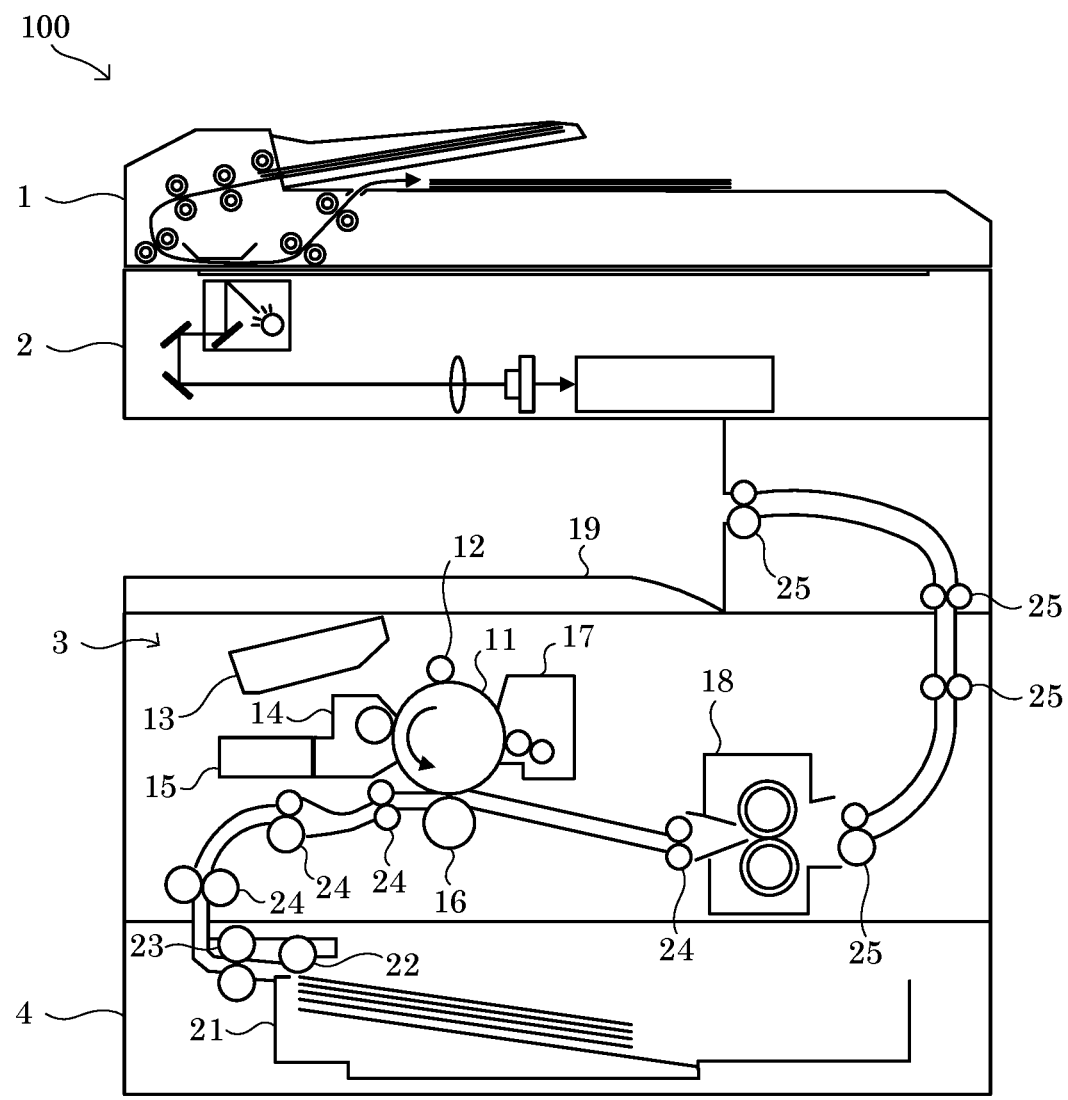
FIG. 1 is a diagram showing a configuration of an image forming apparatus according to an embodiment of the present disclosure.
Figure 2:
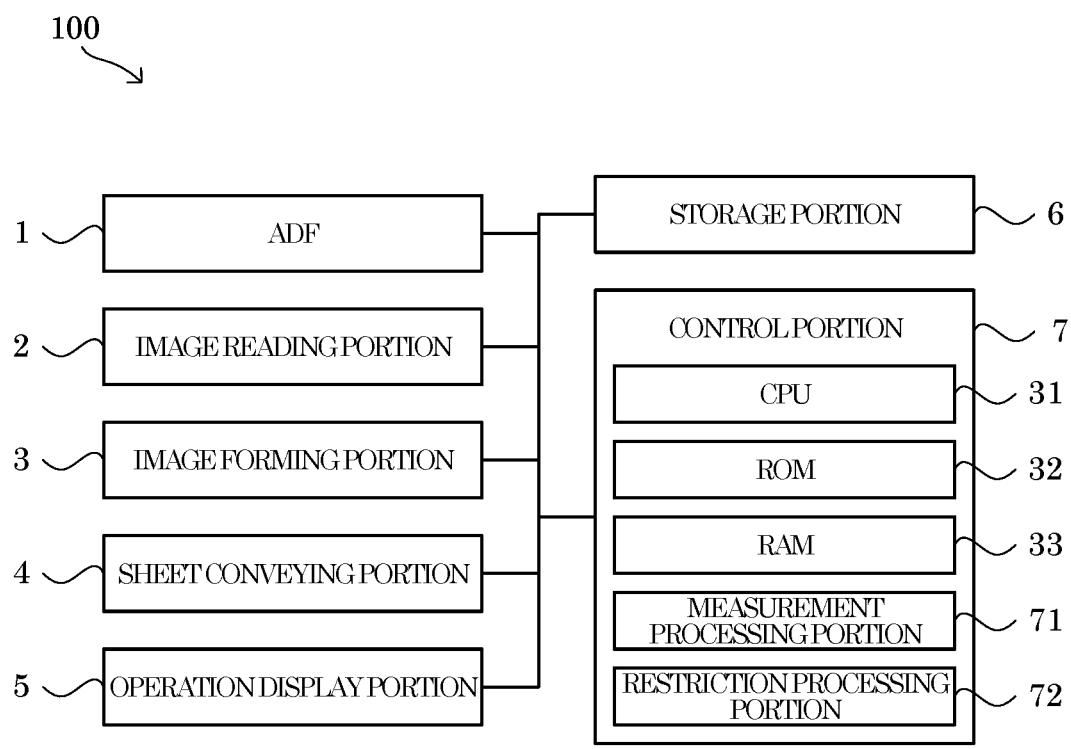
FIG. 2 is a diagram showing a configuration of the image forming apparatus according to the embodiment of the present disclosure.
Figure 3:
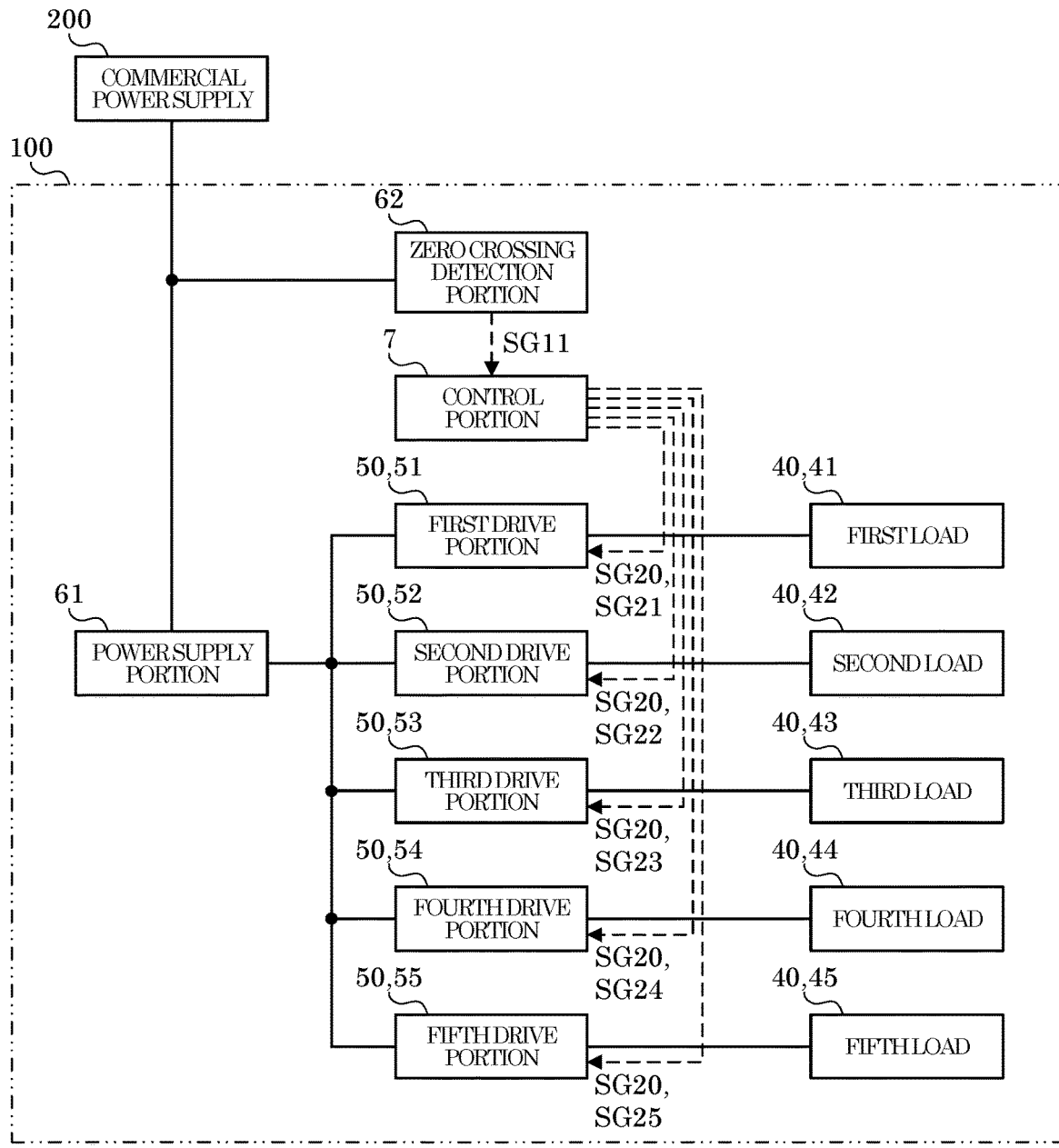
FIG. 3 is a diagram showing a configuration of the image forming apparatus according to the embodiment of the present disclosure.

First, a configuration of an image forming apparatus 100 according to an embodiment of the present disclosure will be described with reference to FIG. 1 to FIG. 3. Here, FIG. 1 is a cross-sectional view showing a configuration of the image forming apparatus 100. In addition, FIG. 2 is a block diagram showing a system configuration of the image forming apparatus 100. In addition, FIG. 3 is a block diagram showing power supply paths of a plurality of loads 40. It is noted that the image forming apparatus 100 is indicated by a dash-dot-dot-dash line in FIG. 3. In addition, in FIG. 3, a detection signal SG11 input to a control portion 7 and a plurality of remote signals SG20 output from the control portion 7 are indicated by broken lines with arrows.

The image forming apparatus 100 is a multifunction peripheral having a plurality of functions such as a facsimile function and a copy function in addition to a scan function for reading an image of a document sheet and a print function for forming an image based on image data. The image forming apparatus 100 is an example of the electronic apparatus of the present disclosure. It is noted that the electronic apparatus of the present disclosure may be image forming apparatuses such as a printer, a facsimile machine, and a copier. In addition, the electronic apparatus of the present disclosure need not be limited to image forming apparatuses.

As shown in FIG. 1 and FIG. 2, the image forming apparatus 100 includes an auto document feeder (ADF) 1, an image reading portion 2, an image forming portion 3, a sheet conveying portion 4, an operation display portion 5, a storage portion 6, and a control portion 7.

The ADF 1 conveys a reading target document sheet to be read by the scan function. The ADF 1 includes a document sheet loading portion, a plurality of conveying rollers, a document sheet holder, and a sheet discharge portion.

The image reading portion 2 implements the scan function. The image reading portion 2 includes a document sheet table, a light source, a plurality of mirrors, an optical lens, and a charge coupled device (CCD).

The image forming portion 3 implements the print function. As shown in FIG. 1, the image forming portion 3 includes a photoconductor drum 11, a charging roller 12, a laser scanning unit 13, a developing device 14, a toner container 15, a transfer roller 16, a cleaning device 17, a fixing device 18, and a sheet discharge tray 19.

The photoconductor drum 11 is provided rotatably in the direction of the arrow shown in FIG. 1. The charging roller 12 is provided in contact with the peripheral surface of the photoconductor drum 11 and charges the peripheral surface of the photoconductor drum 11. The laser scanning unit 13 applies light based on image data to the peripheral surface of the photoconductor drum 11 charged by the charging roller 12. The laser scanning unit 13 forms an electrostatic latent image on the peripheral surface of the photoconductor drum 11.

The developing device 14 uses toner to develop the electrostatic latent image formed on the peripheral surface of the photoconductor drum 11. The toner container 15 supplies toner to the developing device 14. The transfer roller 16 transfers the electrostatic latent image (toner image) developed by the developing device 14 onto a sheet conveyed by the sheet conveying portion 4. The cleaning device 17 cleans the peripheral surface of the photoconductor drum 11 after the toner image has been transferred by the transfer roller 16.

The fixing device 18 fixes the toner image transferred onto the sheet by the transfer roller 16 to the sheet. The sheet to which the toner image has been fixed by the fixing device 18 is discharged to the sheet discharge tray 19.

The sheet conveying portion 4 conveys a sheet on which an image is formed by the image forming portion 3. As shown in FIG. 1, the sheet conveying portion 4 includes a sheet feed cassette 21, a pickup roller 22, a sheet feed roller 23, a plurality of first conveying rollers 24, and a plurality of second conveying rollers 25.

The sheet feed cassette 21 is removably provided in the housing of the image forming apparatus 100, and is loaded with sheets to be supplied to the image forming portion 3. The pickup roller 22 takes out from the sheet feed cassette 21 the uppermost sheet among the plurality of sheets loaded in the sheet feed cassette 21.

The sheet feed roller 23 conveys the sheet taken out from the sheet feed cassette 21 by the pickup roller 22 to the sheet supply path leading to the sheet discharge tray 19 via the transfer position of the toner image by the transfer roller 16 and the fixing device 18. The plurality of first conveying rollers 24 are provided upstream of the fixing device 18 in the sheet conveying direction on the sheet supply path, and conveys the sheet to the fixing device 18 via the transfer position of the toner image by the transfer roller 16. The plurality of second conveying rollers 25 are provided downstream of the fixing device 18 in the sheet conveying direction on the sheet supply path, and conveys the sheet to the sheet discharge tray 19.

The operation display portion 5 is a user interface of the image forming apparatus 100. The operation display portion 5 includes a display portion such as a liquid crystal display that displays various types of information in response to control instructions from the control portion 7, and an operation portion such as operation keys or a touch panel that inputs various types of information to the control portion 7 in response to user's operations.

The storage portion 6 is a nonvolatile storage device. For example, the storage portion 6 is a nonvolatile memory such as a flash memory. It is noted that the storage portion 6 may be a solid state drive (SSD) or a hard disk drive (HDD).

The control portion 7 performs overall control of the image forming apparatus 100. As shown in FIG. 2, the control portion 7 includes a CPU 31, a ROM 32, and a RAM 33. The CPU 31 is a processor that executes various types of arithmetic processing. The ROM 32 is a nonvolatile storage device in which information such as control programs for causing the CPU 31 to execute various types of processing are stored in advance. The RAM 33 is a volatile or nonvolatile storage device used as a temporary storage memory (work area) for various types of processing executed by the CPU 31. The CPU 31 performs overall control of the image forming apparatus 100 by executing various control programs stored in the ROM 32 in advance.

It is noted that the control portion 7 may be a control portion provided separately from a main control portion that performs overall control of the image forming apparatus 100. In addition, the control portion 7 may be composed of an electronic circuit such as an integrated circuit (ASIC).

As shown in FIG. 3, the image forming apparatus 100 includes a plurality of loads 40. Specifically, the image forming apparatus 100 includes a first load 41, a second load 42, a third load 43, a fourth load 44, and a fifth load 45.

The first load 41 is a motor that generates a rotational driving force for rotating the photoconductor drum 11.

The second load 42 is a motor that generates a rotational driving force for rotating a pressure roller included in the fixing device 18.

The third load 43 is a motor that generates a rotational driving force for rotating the pickup roller 22 and the sheet feed roller 23.

The fourth load 44 is a motor that generates a rotational driving force for rotating the plurality of first conveying rollers 24.

The fifth load 45 is a motor that generates a rotational driving force for rotating the plurality of second conveying rollers 25.

It is noted that the image forming apparatus 100 may include a load 40 different from the above-described loads 40. In addition, the loads 40 are not limited to motors, but may also be solenoids, electromagnetic clutches, heaters, or the like.

In addition, as shown in FIG. 3, the image forming apparatus 100 includes a power supply portion 61 and a zero crossing detection portion 62.

The power supply portion 61 outputs power in response to power supply from a commercial power supply 200 (see FIG. 3). Specifically, the power supply portion 61 is an AC-DC converter that converts a 100V AC voltage output from the commercial power supply 200 into a DC voltage of a predetermined voltage value and outputs the DC voltage. It is noted that the power supply portion 61 may be an inverter that outputs an AC voltage.

Each of the loads 40 is driven by power output from the power supply portion 61.

The zero crossing detection portion 62 is an electric circuit capable of detecting a zero crossing point of the AC voltage output from the commercial power supply 200. When the zero crossing detection portion 62 detects a zero crossing point, the zero crossing detection portion 62 outputs a detection signal SG11 indicating the detection of the zero crossing point. The detection signal SG11 output from the zero crossing detection portion 62 is input to the control portion 7.

In addition, as shown in FIG. 3, the image forming apparatus 100 includes drive portions 50 provided corresponding to the respective loads 40. Each of the drive portions 50 performs a state transition between a drive state in which the load 40 is driven and a non-drive state in which the load 40 is not driven.

Specifically, the image forming apparatus 100 includes a first drive portion 51, a second drive portion 52, a third drive portion 53, a fourth drive portion 54, and a fifth drive portion 55.

The first drive portion 51 is provided corresponding to the first load 41. The first drive portion 51 performs a state transition from the non-drive state to the drive state in response to an input of a first remote signal SG21 (see FIG. 3) output from the control portion 7. In the drive state, the first drive portion 51 supplies power output from the power supply portion 61 to the first load 41. In addition, the first drive portion 51 performs a state transition from the drive state to the non-drive state in response to the control portion 7 stopping the output of the first remote signal SG21. In the non-driven state, the first drive portion 51 stops the supply of power output from the power supply portion 61 to the first load 41.

The second drive portion 52 is provided corresponding to the second load 42. The second drive portion 52 performs a state transition from the non-drive state to the drive state in response to an input of a second remote signal SG22 (see FIG. 3) output from the control portion 7. In the drive state, the second drive portion 52 supplies power output from the power supply portion 61 to the second load 42. In addition, the second drive portion 52 performs a state transition from the drive state to the non-drive state in response to the control portion 7 stopping the output of the second remote signal SG22. In the non-drive state, the second drive portion 52 stops the supply of power output from the power supply portion 61 to the second load 42.

The third drive portion 53 is provided corresponding to the third load 43. The third drive portion 53 performs a state transition from the non-drive state to the drive state in response to an input of a third remote signal SG23 (see FIG. 3) output from the control portion 7. In the drive state, the third drive portion 53 supplies power output from the power supply portion 61 to the third load 43. In addition, the third drive portion 53 performs a state transition from the drive state to the non-drive state in response to the control portion 7 stopping the output of the third remote signal SG23. In the non-drive state, the third drive portion 53 stops the supply of power output from the power supply portion 61 to the third load 43.

The fourth drive portion 54 is provided corresponding to the fourth load 44. The fourth drive portion 54 performs a state transition from the non-drive state to the drive state in response to an input of a fourth remote signal SG24 (see FIG. 3) output from the control portion 7. In the drive state, the fourth drive portion 54 supplies power output from the power supply portion 61 to the fourth load 44. In addition, the fourth drive portion 54 performs a state transition from the drive state to the non-drive state in response to the control portion 7 stopping the output of the fourth remote signal SG24. In the non-drive state, the fourth drive portion 54 stops the supply of power output from the power supply portion 61 to the fourth load 44.

The fifth drive portion 55 is provided corresponding to the fifth load 45. The fifth drive portion 55 performs a state transition from the non-drive state to the drive state in response to an input of a fifth remote signal SG25 (see FIG. 3) output from the control portion 7. In the drive state, the fifth drive portion 55 supplies power output from the power supply portion 61 to the fifth load 45. In addition, the fifth drive portion 55 performs a state transition from the drive state to the non-drive state in response to the control portion 7 stopping the output of the fifth remote signal SG25. In the non-drive state, the fifth drive portion 55 stops the supply of power output from the power supply portion 61 to the fifth load 45.

The control portion 7 can individually switch the states of the drive portions 50. Specifically, the control portion 7 can individually switch the states of the drive portions 50 by individually controlling the outputs of the plurality of remote signals SG20 (see FIG. 3) corresponding to the plurality of drive portions 50.

By the way, in the image forming apparatus 100, when a plurality of drive portions 50 are in the drive state, the power supply from the commercial power supply 200 to the power supply portion 61 may temporarily stop due to a lightning strike or the like. In the conventional electronic apparatus, when the power supply from the commercial power supply 200 to the power supply portion 61 is resumed, a plurality of loads 40 whose operations have been stopped by the stoppage of the power supply from the commercial power supply 200 are simultaneously activated and a large current flows into the power supply portion 61, so that an element such as an FET provided in the power supply portion 61 may fail due to the large current.

In contrast, in the image forming apparatus 100 according to the embodiment of the present disclosure, when power supply from the commercial power supply 200 is temporarily stopped, the current flowing when the power supply is resumed can be suppressed as will be described below.

[Configuration of Control Portion 7]

Next, the configuration of the control portion 7 will be described in more detail with reference to FIG. 2.

As shown in FIG. 2, the control portion 7 includes a measurement processing portion 71 and a restriction processing portion 72.

Specifically, the ROM 32 of the control portion 7 stores in advance drive control programs for causing the CPU 31 to function as the processing portions described above. By executing the drive control programs stored in the ROM 32, the CPU 31 functions as the processing portions described above.

It is noted that the drive control programs may be recorded on a computer-readable recording medium such as a CD, a DVD, or a flash memory, and may be read from the recording medium and stored in a storage device such as the storage portion 6. In addition, some or all of the processing portions included in the control portion 7 may be constituted by electronic circuits. In addition, the drive control programs may be programs for causing a plurality of processors to function as the processing portions included in the control portion 7.

The measurement processing portion 71 measures an output interval of the detection signal SG11 from the zero crossing detection portion 62.

For example, when a predetermined measurement start condition is satisfied, the measurement processing portion 71 starts the measurement of the output interval. For example, the measurement start condition is that two or more drive portions 50 are in the drive state. In addition, when a predetermined measurement end condition is satisfied, the measurement processing portion 71 ends the measurement of the output interval. For example, the measurement end condition is a transition from a state in which the measurement start condition is satisfied to a state in which the measurement start condition is not satisfied.

It is noted that the measurement processing portion 71 may measure the output interval at all times.

When stoppage of power supply from the commercial power supply 200 to the power supply portion 61 continues beyond a predetermined reference time while a plurality of drive portions 50 are in the drive state, the restriction processing portion 72 can restrict activation of some or all of a plurality of loads 40 whose operations have been stopped by the stoppage of the power supply from the commercial power supply 200 in response resumption of power supply from the commercial power supply 200.

For example, the reference time is set based on a time (hereinafter referred to as a "specific time") from the time of stoppage of power supply to the time of stoppage of the operation of a load 40 that is the second to stop operation due to the stoppage of power supply from the commercial power supply 200 among the five loads 40 included in the image forming apparatus 100. This makes it possible to restrict the activation of one or more loads 40 when there are a plurality of loads 40 whose operations have been stopped by the stoppage of power supply. Therefore, it is possible to suppress simultaneous activation of a plurality of loads 40 when power supply from the commercial power supply 200 is resumed.

For example, the reference time is the same length of time as the specific time. It is noted that the reference time may be a different length of time than the specific time, which is set based on the specific time. In addition, the reference time may be a time set without being based on the specific time.

For example, when the measured value of the output interval by the measurement processing portion 71 exceeds the total of the output period of the detection signal SG11 corresponding to the frequency of the AC voltage of the commercial power supply 200 and the reference time, the restriction processing portion 72 determines that the stoppage of power supply from the commercial power supply 200 to the power supply portion 61 has continued beyond the reference time.

For example, when the stoppage of power supply from the commercial power supply 200 to the power supply portion 61 continues beyond the reference time while a plurality of drive portions 50 are in the drive state and a predetermined activation restriction condition is satisfied, the restriction processing portion 72 restricts activation of some or all of a plurality of loads 40 whose operations have been stopped by the stoppage of power supply from the commercial power supply 200 in response to resumption of power supply from the commercial power supply 200.

For example, the activation restriction condition includes that the total of predetermined specific values acquired for the drive portions 50 in the drive state in relation to the power consumptions of the loads 40 corresponding to the drive portions 50 is equal to or greater than a predetermined threshold value.

For example, in the image forming apparatus 100, table data TD10 (see FIG. 4) indicating the correspondence relationship between the drive portions 50 and the specific values is stored in the storage portion 6 in advance. As shown in FIG. 4, in the table data TD10, a drive portion 50 and a specific value corresponding to the drive portion 50 are associated with each other for each drive portion 50. For example, the specific value is a value indicating the magnitude of the power consumption of the load 40. The larger the specific value corresponding to the drive portion 50, the larger the power consumption of the load 40 corresponding to the drive portion 50. It is noted that the specific value may be a value indicating the magnitude of the current flowing when the load 40 is driven. Alternatively, the specific value may be a power value of the power consumption of the load 40.

In addition, in the image forming apparatus 100, the threshold value is set to "6". That is, in the image forming apparatus 100, when the stoppage of power supply from the commercial power supply 200 to the power supply portion 61 continues beyond the reference time while only the first drive portion 51 and the second drive portion 52 among the five drive portions 50 are in the drive state, it is determined that the activation restriction condition is satisfied. In addition, in the image forming apparatus 100, when the stoppage of power supply from the commercial power supply 200 to the power supply portion 61 continues beyond the reference time while only the first drive portion 51 and the third drive portion 53 among the five drive portions 50 are in the drive state, it is determined that the activation restriction condition is not satisfied. It is noted that the threshold value may be an arbitrarily set value.

When the stoppage of power supply from the commercial power supply 200 to the power supply portion 61 continues beyond the reference time while a plurality of drive portions 50 are in the drive state, the restriction processing portion 72 uses the table data TD10 to acquire the specific value corresponding to the drive portion 50 for each of the drive portions 50 in the drive state. In addition, the restriction processing portion 72 calculates the total of the acquired specific values. Then, the restriction processing portion 72 determines whether or not the activation restriction condition is satisfied, based on a comparison result between the calculated total value and the threshold value.

It is noted that the activation restriction condition may include that the plurality of drive portions 50 in the drive state include one or more predetermined specific drive portions. For example, by previously determining a drive portion 50 with the corresponding load 40 having a large power consumption as the specific drive portion, it is possible to restrict the activation of one or more loads 40 only when the current flowing when power supply from the commercial power supply 200 is resumed is large. In addition, when the stoppage of power supply from the commercial power supply 200 to the power supply portion 61 continues beyond the reference time while a plurality of drive portions 50 are in the drive state, the restriction processing portion 72 may restrict, regardless of whether the predetermined activation restriction condition is satisfied, activation of some or all of the plurality of loads 40 whose operations have been stopped by the stoppage of power supply from the commercial power supply 200 in response to resumption of power supply from the commercial power supply 200.

For example, by placing one or more drive portions 50 corresponding to one or more loads 40 whose activation is restricted in the non-drive state, the restriction processing portion 72 restricts activation of the one or more loads 40 in response to resumption of power supply from the commercial power supply 200.

It is noted that, for each power supply path from the drive portion 50 to the load 40, a switch capable of switching between conduction and interruption of the power supply path may be provided. In this case, the restriction processing portion 72 may operate one or more switches corresponding to one or more loads 40 whose activation is restricted to restrict activation of the one or more loads 40 in response to resumption of power supply from the commercial power supply 200.

For example, when restricting activation of loads 40, the restriction processing portion 72 restricts activation of all of a plurality of loads 40 whose operations have been stopped by stoppage of power supply from the commercial power supply 200 in response to resumption of power supply from the commercial power supply 200. In this case, the restriction processing portion 72 may sequentially lift the activation restrictions of the plurality of loads 40 whose activation has been restricted in accordance with a predetermined order after the resumption of power supply from the commercial power supply 200.

Alternatively, when restricting activation of loads 40, the restriction processing portion 72 may restrict activation of the remaining loads 40, excluding any one of a plurality of loads 40, whose operations have been stopped by stoppage of power supply from the commercial power supply 200 in response to resumption of power supply from the commercial power supply 200. In this case, the restriction processing portion 72 may sequentially lift the activation restrictions of the one or more loads 40 whose activation has been restricted in accordance with a predetermined order after the resumption of power supply from the commercial power supply 200.

[Drive Control Processing]

Figure 5:
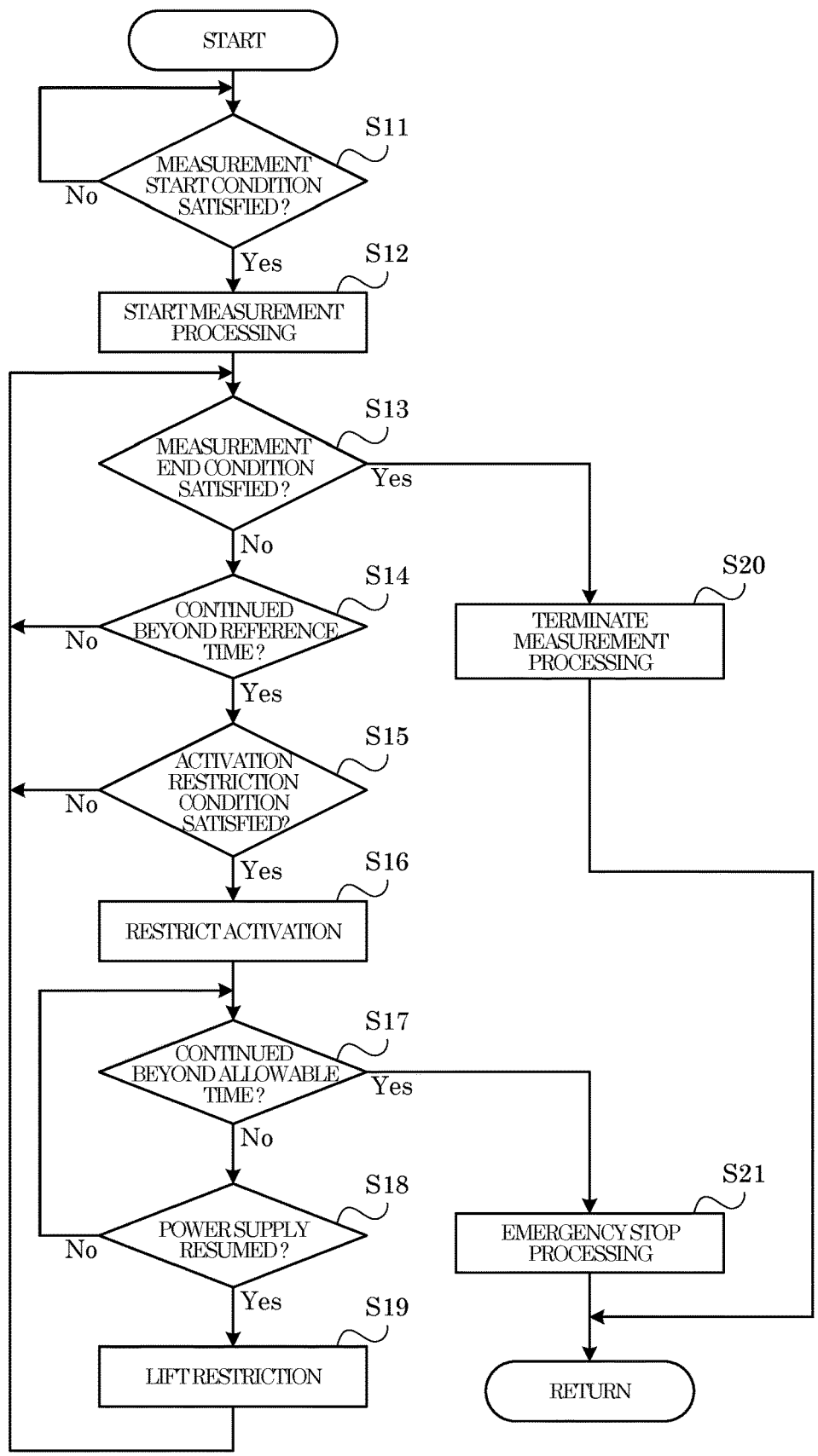
FIG. 5 is a flowchart showing an example of drive control processing executed in the image forming apparatus according to the embodiment of the present disclosure.

The drive control method of the present disclosure will be described below with reference to FIG. 5, along with an example of the procedure of the drive control processing executed by the control portion 7 in the image forming apparatus 100. Here, steps S11, S12, . . . represent the numbers of the processing procedure (steps) executed by the control portion 7. For example, the control portion 7 executes the drive control processing when image forming processing for forming an image on a sheet using the image forming portion 3 and the sheet conveying portion 4 is executed. In addition, the control portion 7 terminates the drive control processing when the image forming processing ends.

<Step S11>

First, in step S11, the control portion 7 determines whether or not the measurement start condition is satisfied.

Specifically, the control portion 7 determines that the measurement start condition is satisfied when a plurality of drive portions 50 are in the drive state.

Here, when the control portion 7 determines that the measurement start condition is satisfied (Yes in S11), the control portion 7 shifts the processing to step S12. In addition, when the measurement start condition is not satisfied (No in S11), the control portion 7 waits for the measurement start condition to be satisfied in step S11.

<Step S12>

In step S12, the control portion 7 starts measurement processing for measuring the output interval of the detection signal SG11 by the zero crossing detection portion 62. The processing of step S12 is executed by the measurement processing portion 71 of the control portion 7.

<Step S13>

In step S13, the control portion 7 determines whether or not the measurement end condition is satisfied.

Here, when the control portion 7 determines that the measurement end condition is satisfied (Yes in S13), the control portion 7 shifts the processing to step S20. In addition, when the measurement end condition is not satisfied (No in S13), the control portion 7 shifts the processing to step S14.

<Step S14>

In step S14, the control portion 7 determines whether or not stoppage of power supply from the commercial power supply 200 to the power supply portion 61 has continued beyond the reference time.

Specifically, when the measured value of the output interval by the measurement processing exceeds the total of the output period of the detection signal SG11 and the reference time, the control portion 7 determines that stoppage of power supply from the commercial power supply 200 to the power supply portion 61 has continued beyond the reference time.

Here, when the control portion 7 determines that stoppage of power supply from the commercial power supply 200 to the power supply portion 61 has continued beyond the reference time (Yes in S14), the control portion 7 shifts the processing to step S15. In addition, when stoppage of power supply from the commercial power supply 200 to the power supply portion 61 has not continued beyond the reference time (No in S14), the control portion 7 shifts the processing to step S13.

<Step S15>

In step S15, the control portion 7 determines whether or not the activation restriction condition is satisfied.

Specifically, the control portion 7 uses the table data TD10 (see FIG. 4) to acquire the specific value corresponding to each of the drive portions 50 in the drive state. In addition, the control portion 7 calculates the total of the plurality of acquired specific values. When the calculated total value is equal to or larger than the threshold value, the control portion 7 determines that the activation restriction condition is satisfied.

Here, when the control portion 7 determines that the activation restriction condition is satisfied (Yes in S15), the control portion 7 shifts the processing to step S16. In addition, when the activation restriction condition is not satisfied (No in S15), the control portion 7 shifts the processing to step S13.

It is noted that the measurement start condition may be that a plurality of drive portions 50 are in the drive state and the activation restriction condition is satisfied. In this case, the processing of step S15 may be omitted.

<Step S16>

In step S16, the control portion 7 restricts activation of all of a plurality of loads 40 whose operations have been stopped by the stoppage of power supply from the commercial power supply 200 in response to resumption of power supply from the commercial power supply 200. Here, the processing of step S16 is executed by the restriction processing portion 72 of the control portion 7.

For example, by placing a plurality of drive portions 50 corresponding to a plurality of loads 40 whose activation is restricted in the non-drive state, the control portion 7 restricts activation of the plurality of loads 40 in response to resumption of power supply from the commercial power supply 200. It is noted that, by stopping the output of the remote signal SG20 to each of the drive portions 50 in the drive state, the control portion 7 can place the plurality of drive portions 50 corresponding to the plurality of loads 40 whose activation is restricted in the non-drive state.

<Step S17>

In step S17, the control portion 7 determines whether or not the stoppage of power supply from the commercial power supply 200 to the power supply portion 61 has continued beyond a predetermined allowable time. The allowable time is longer than the reference time.

Specifically, when the measured value of the output interval by the measurement processing exceeds the total of the output period of the detection signal SG11 and the allowable time, the control portion 7 determines that the stoppage of power supply from the commercial power supply 200 to the power supply portion 61 has continued beyond the allowable time.

Here, when the control portion 7 determines that the stoppage of power supply from the commercial power supply 200 to the power supply portion 61 has continued beyond the allowable time (Yes in S17), the control portion 7 shifts the processing to step S21. In addition, when the stoppage of power supply from the commercial power supply 200 to the power supply portion 61 has not continued beyond the allowable time (No in S17), the control portion 7 shifts the processing to step S18.

<Step S18>

In step S18, the control portion 7 determines whether or not the power supply from the commercial power supply 200 to the power supply portion 61 has been resumed.

Specifically, the control portion 7 determines that the power supply from the commercial power supply 200 to the power supply portion 61 has been resumed when the measured value of the output interval by the measurement processing is reset in response to an output of the detection signal SG11 by the zero crossing detection portion 62.

Here, when the control portion 7 determines that the power supply from the commercial power supply 200 to the power supply portion 61 has been resumed (Yes in S18), the control portion 7 shifts the processing to step S19. In addition, when the power supply from the commercial power supply 200 to the power supply portion 61 has not been resumed (No in S18), the control portion 7 shifts the processing to step S17.

<Step S19>

In step S19, the control portion 7 lifts the activation restriction for the plurality of loads 40 whose activation has been restricted by the processing of step S16.

Specifically, the control portion 7 sequentially switches the states of the plurality of drive portions 50 corresponding to the plurality of loads 40 whose activation has been restricted to the drive state in accordance with a predetermined order after the resumption of power supply from the commercial power supply 200. Thus, the plurality of loads 40 are sequentially activated. Therefore, the current flowing through the power supply portion 61 can be suppressed as compared with the configuration in which the plurality of loads 40 are simultaneously activated.

<Step S20>

In step S20, the control portion 7 terminates the measurement processing.

<Step S21>

In step S21, the control portion 7 executes an emergency stop processing for stopping the image forming processing being executed and terminating the measurement processing. Then, when the power supply from the commercial power supply 200 to the power supply portion 61 is resumed, the control portion 7 resumes the image forming processing, and shifts the processing to step S11.

As described above, in the image forming apparatus 100, when stoppage of power supply from the commercial power supply 200 to the power supply portion 61 continues beyond the reference time while a plurality of drive portions 50 are in the drive state, it is possible to restrict activation of all of a plurality of loads 40 whose operations have been stopped by the stoppage of power supply from the commercial power supply 200 in response resumption of power supply from the commercial power supply 200. Thus, it is possible to suppress simultaneous activation of the plurality of drive portions 50 in response to resumption of power supply from the commercial power supply 200. Therefore, when the power supply from the commercial power supply 200 is temporarily stopped, it is possible to suppress the current flowing when the power supply is resumed.

In addition, in the image forming apparatus 100, when stoppage of power supply from the commercial power supply 200 to the power supply portion 61 continues beyond the reference time while a plurality of drive portions 50 are in the drive state and the activation restriction condition is satisfied, activation of all of the plurality of loads 40 whose operations have been stopped by the stoppage of power supply from the commercial power supply 200 in response to resumption of power supply from the commercial power supply 200 is restricted. This makes it possible to restrict activation of one or more loads 40 only when the current flowing when the power supply from the commercial power supply 200 is resumed is large, for example, by defining the activation restriction condition as the total of the specific values acquired for the drive portions 50 in the drive state being greater than the threshold value.

[Appendixes to Disclosure]

The following are appendixes to the overview of the disclosure extracted from the above embodiment. It is noted that the structures and processing functions to be described in the following appendixes can be selected and combined arbitrarily.

APPENDIX 1

An electronic apparatus comprising: a power supply portion configured to output power in response to power supply from a commercial power supply; a plurality of loads configured to be driven by the power output from the power supply portion; a drive portion provided corresponding to each of the loads and configured to perform a state transition between a drive state in which the load is driven and a non-drive state in which the load is not driven; and a restriction processing portion configured to, when stoppage of power supply from the commercial power supply to the power supply portion continues beyond a predetermined reference time while a plurality of drive portions of the drive portions are in the drive state, restrict activation of some or all of a plurality of loads of the loads whose operations have been stopped by the stoppage of the power supply from the commercial power supply in response to resumption of the power supply from the commercial power supply.

APPENDIX 2

The electronic apparatus according to Appendix 1, wherein the restriction processing portion places one or more drive portions of the drive portions corresponding to one or more loads of the loads whose activation is restricted in the non-drive state to restrict the activation of the one or more loads in response to the resumption of the power supply from the commercial power supply.

APPENDIX 3

The electronic apparatus according to Appendix 1 or 2, wherein the restriction processing portion restricts activation of some or all of the plurality of loads whose operations have been stopped by the stoppage of the power supply from the commercial power supply when the stoppage of the power supply from the commercial power supply to the power supply portion continues beyond the reference time while the plurality of drive portions are in the drive state and a predetermined activation restriction condition is satisfied.

APPENDIX 4

The electronic apparatus according to Appendix 3, wherein the activation restriction condition includes that a total of predetermined specific values acquired for the drive portions in the drive state in relation to power consumptions of the loads corresponding to the drive portions is equal to or greater than a predetermined threshold value.

APPENDIX 5

The electronic apparatus according to Appendix 3, wherein the activation restriction condition includes that the plurality of drive portions in the drive state include one or more predetermined specific drive portions.

APPENDIX 6

The electronic apparatus according to any one of Appendixes 1 to 5, further comprising one or both of an image reading portion configured to read an image of a document sheet and an image forming portion configured to form an image based on image data.

APPENDIX 7

A drive control method executed in an electronic apparatus including: a power supply portion configured to output power in response to power supply from a commercial power supply; a plurality of loads configured to be driven by the power output from the power supply portion; and a drive portion provided corresponding to each of the loads and configured to perform a state transition between a drive state in which the load is driven and a non-drive state in which the load is not driven, the drive control method comprising: when stoppage of power supply from the commercial power supply to the power supply portion continues beyond a predetermined reference time while a plurality of drive portions of the drive portions are in the drive state, restricting activation of some or all of a plurality of loads of the loads whose operations have been stopped by the stoppage of the power supply from the commercial power supply in response to resumption of the power supply from the commercial power supply.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An electronic apparatus comprising:
a power supply portion configured to output power in response to power supply from a commercial power supply;
a plurality of loads configured to be driven by the power output from the power supply portion;
a drive portion provided corresponding to each of the loads and configured to perform a state transition between a drive state in which the load is driven and a non-drive state in which the load is not driven;
a zero crossing detection portion configured to detect a zero crossing point of an AC voltage output from the commercial power supply;
a measurement processing portion configured to measure an output interval of a detection signal when the zero crossing point is detected by the zero crossing detection portion; and
a restriction processing portion configured to, when stoppage of power supply from the commercial power supply to the power supply portion continues beyond a predetermined reference time while a plurality of drive portions of the drive portions are in the drive state, restrict activation of some or all of a plurality of loads of the loads whose operations have been stopped by the stoppage of the power supply from the commercial power supply in response to resumption of the power supply from the commercial power supply, wherein
the restriction processing portion determines whether the stoppage of the power supply from the commercial power supply to the power supply portion has continued beyond the reference time, based on a value of the output interval of the detection signal measured by the measurement processing portion, and
the restriction processing portion restricts the activation of some or all of the plurality of loads whose operations have been stopped by the stoppage of the power supply from the commercial power supply in response to resumption of the power supply from the commercial power supply when the stoppage of the power supply from the commercial power supply to the power supply portion continues beyond the reference time while the plurality of drive portions are in the drive state and a predetermined activation restriction condition is satisfied.

2. The electronic apparatus according to claim 1, wherein the restriction processing portion places one or more drive portions, of the drive portions corresponding to one or more loads of the loads whose activation is restricted, in the non-drive state to restrict the activation of the one or more loads in response to the resumption of the power supply from the commercial power supply.

3. The electronic apparatus according to claim 1, wherein the activation restriction condition includes that a total of predetermined specific values acquired for the drive portions in the drive state in relation to power consumptions of the loads corresponding to the drive portions is equal to or greater than a predetermined threshold value.

4. The electronic apparatus according to claim 1, wherein the activation restriction condition includes that the plurality of drive portions in the drive state include one or more predetermined specific drive portions.

5. The electronic apparatus according to claim 1, further comprising one or both of an image reading portion configured to read an image of a document sheet and an image forming portion configured to form an image based on image data.

6. A drive control method executed in an electronic apparatus including: a power supply portion configured to output power in response to power supply from a commercial power supply; a plurality of loads configured to be driven by the power output from the power supply portion; a drive portion provided corresponding to each of the loads and configured to perform a state transition between a drive state in which the load is driven and a non-drive state in which the load is not driven; and a zero crossing detection portion configured to detect a zero crossing point of an AC voltage output from the commercial power supply, the drive control method comprising:
- a measurement step of measuring an output interval of a detection signal when the zero crossing point is detected by the zero crossing detection portion; and
- a restriction step of, when stoppage of power supply from the commercial power supply to the power supply portion continues beyond a predetermined reference time while a plurality of drive portions of the drive portions are in the drive state, restricting activation of some or all of a plurality of loads of the loads whose operations have been stopped by the stoppage of the power supply from the commercial power supply in response to resumption of the power supply from the commercial power supply, wherein
- in the restriction step, whether the stoppage of the power supply from the commercial power supply to the power supply portion has continued beyond the reference time is determined based on a value of the output interval of the detection signal measured in the measurement step, and
- in the restriction step, the activation of some or all of the plurality of loads whose operations have been stopped by the stoppage of the power supply from the commercial power supply in response to resumption of the power supply from the commercial power supply is restricted when the stoppage of the power supply from the commercial power supply to the power supply portion continues beyond the reference time while the plurality of drive portions are in the drive state and a predetermined activation restriction condition is satisfied.

* * * * *